(12) United States Patent
Wang et al.

(10) Patent No.: US 11,496,255 B2
(45) Date of Patent: Nov. 8, 2022

(54) MULTIPLEXING FOR SEQUENCE BASED ACKNOWLEDGEMENT DESIGN FOR NEW RADIO

(71) Applicant: QUALCOMM Incorporated, San Diego, CA (US)

(72) Inventors: Renqiu Wang, San Diego, CA (US); Seyong Park, San Diego, CA (US); Hao Xu, Beijing (CN); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 15/940,710

(22) Filed: Mar. 29, 2018

(65) Prior Publication Data

US 2018/0302198 A1    Oct. 18, 2018

Related U.S. Application Data

(60) Provisional application No. 62/486,414, filed on Apr. 17, 2017.

(51) Int. Cl.
*H04L 5/00* (2006.01)
*H04W 72/04* (2009.01)
(Continued)

(52) U.S. Cl.
CPC .......... *H04L 5/0007* (2013.01); *H04L 1/0073* (2013.01); *H04L 1/1861* (2013.01);
(Continued)

(58) Field of Classification Search
CPC .. H04L 5/0007; H04W 72/0413; H04W 72/12
See application file for complete search history.

(56) References Cited

U.S. PATENT DOCUMENTS

2009/0279493 A1    11/2009  Gaal et al.
2011/0292902 A1*   12/2011  Yang ..................... H04L 1/1614
                                                     370/329
(Continued)

FOREIGN PATENT DOCUMENTS

CN    101779392 A    7/2010
CN    101978635 A    2/2011
(Continued)

OTHER PUBLICATIONS

NEC: "Design for Structure of PUCCH in Short Duration", 3GPP Draft, R1-1704602, Design For Structure of PUCCH In Short Duration, 3RD Generation Partnership Project (3GPP), Mobile Competence Centre, 658, Route Des Lucioles, F-06921, Sophia-Antipolis Cedex, vol. RAN WG1, No. Spokane, USA, 28178483—Apr. 7, 2017, Mar. 24, 2017 (Mar. 24, 2017), XP051250518, 3 Pages, Retrieved from the Internet: URL:http://www.3gpp.org/ftp/tsg ran/WG1 RL 1/TSGR188b/Docs/ [retrieved on Mar. 24, 2017].
(Continued)

*Primary Examiner* — Kodzovi Acolatse
*Assistant Examiner* — Farhad Ali
(74) *Attorney, Agent, or Firm* — Arent Fox, LLP

(57) ABSTRACT

A method and apparatus for improved transmission of ACK and NACK bits to a base station The example method may determine a distance between a first UE and a second UE based on one or more of a sequence length, a number of hypothesis, or a number of UEs sharing an OFDM symbol. The example method may determine a plurality of cyclic shifts for each of the first UE and the second UE. The example method may assign one or more sequences to each UE. The example method may receive, at the base station, a multiplexed signal, wherein the multiplexed signal includes at least one bit of uplink control information (UCI) from the first UE and the second UE multiplexed on an uplink short (Continued)

burst transmitted via the OFDM symbol. The method may enable the receipt of UCI from multiple UEs in a multiplexed signal.

34 Claims, 11 Drawing Sheets

(51) Int. Cl.
| | |
|---|---|
| *H04W 72/12* | (2009.01) |
| *H04L 1/00* | (2006.01) |
| *H04L 1/18* | (2006.01) |
| *H04W 88/08* | (2009.01) |
| *H04W 88/02* | (2009.01) |
| *H04J 1/02* | (2006.01) |

(52) U.S. Cl.
CPC ....... *H04L 5/0055* (2013.01); *H04W 72/0413* (2013.01); *H04W 72/12* (2013.01); *H04J 1/02* (2013.01); *H04L 5/0048* (2013.01); *H04W 88/02* (2013.01); *H04W 88/08* (2013.01)

(56) References Cited

U.S. PATENT DOCUMENTS

| | | | |
|---|---|---|---|
| 2018/0192397 A1* | 7/2018 | Seo | ........................ H04L 5/0044 |
| 2020/0045691 A1 | 2/2020 | Park et al. | |

FOREIGN PATENT DOCUMENTS

| | | |
|---|---|---|
| CN | 106506127 A | 3/2017 |
| JP | 2013505622 A | 2/2013 |
| JP | 2015144440 A | 8/2015 |
| JP | 2018143393 A1 | 12/2019 |
| WO | WO-2017146756 A1 * | 8/2017 ........... H04L 1/0057 |

OTHER PUBLICATIONS

NTT DOCOMO et al., "DMRS-Based vs. Sequence-Based PUCCH in Short Duration", 3GPP Draft; R1-1702811, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 13-17, 2017, Feb. 12, 2017 (Feb. 12, 2017), XP051209956, 9 Pages, Retrieved from the Internet: URL:http://www.3gpp.org/ftp/Meetings_3GPP_SYNC/RAN1/Docs/ [retrieved on Feb. 12, 2017].
Partial International Search Report—PCT/US2018/025524—ISA/EPO—dated Jul. 4, 2018.
International Search Report and Written Opinion—PCT/US2018/025524—ISA/EPO—dated Aug. 29, 2018.
NTT Docomo, Inc: "Sequence-based PUCCH vs DMRS-based Pucch", 3GPP Draft, 3GPP TSG RAN WG1 Meeting #88bis, R1-1705739, 3rd Generation Partnership Project (3GPP), Mobile Competence Centre, 650, Route Des Lucioles, F-06921, Sophia-Antipolis, Cedex, France, vol. Ran WG1, No. Spokane, USA, Apr. 3, 2017-Apr. 7, 2017, Apr. 2, 2017 (Apr. 2, 2017), XP051243854, pp. 1-9, Retrieved from the Internet: URL:http://www.3gpp.org/ftp/Meetings_3GPP_SYNC/RAN1/Docs/[retrieved on Apr. 2, 2017], p. 2.
Taiwan Search Report—TW107111278—TIPO—dated Jul. 26, 2021.
Oualcomm Incorporated: "Channelization of Short Pucch", 3GPP TSG RAN WG1 Meeting #88bis, 3GPP Draft, R1-1705610 Channelization of Short PUCCH, 3rd Generation Partnership Project (3GPP), Mobile Competence Centre, 650, Route Des Lucioles, F-06921, Sophia-Anti polis Cedex, France, vol. Ran WG1, No. Spokane, USA, Apr. 3, 2017-Apr. 7, 2017, Apr. 2, 2017, XP051243734, 10 Pages, Retrieved from the Internet: URL: http://www.3gpp.org/ftp/Meetings_3GPP_SYNC/RAN1/Docs/ [retrieved on Apr. 2, 2017].

* cited by examiner

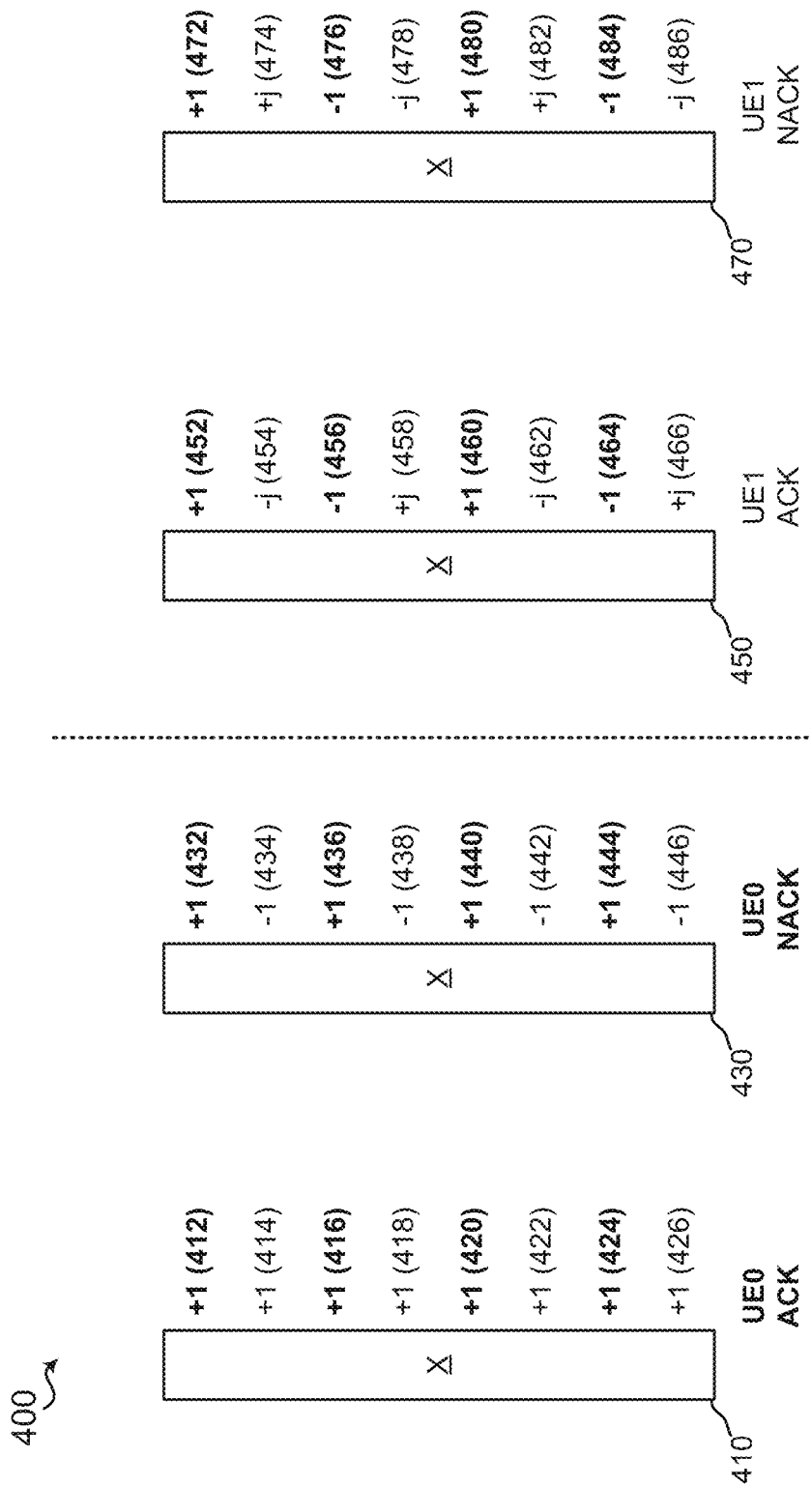

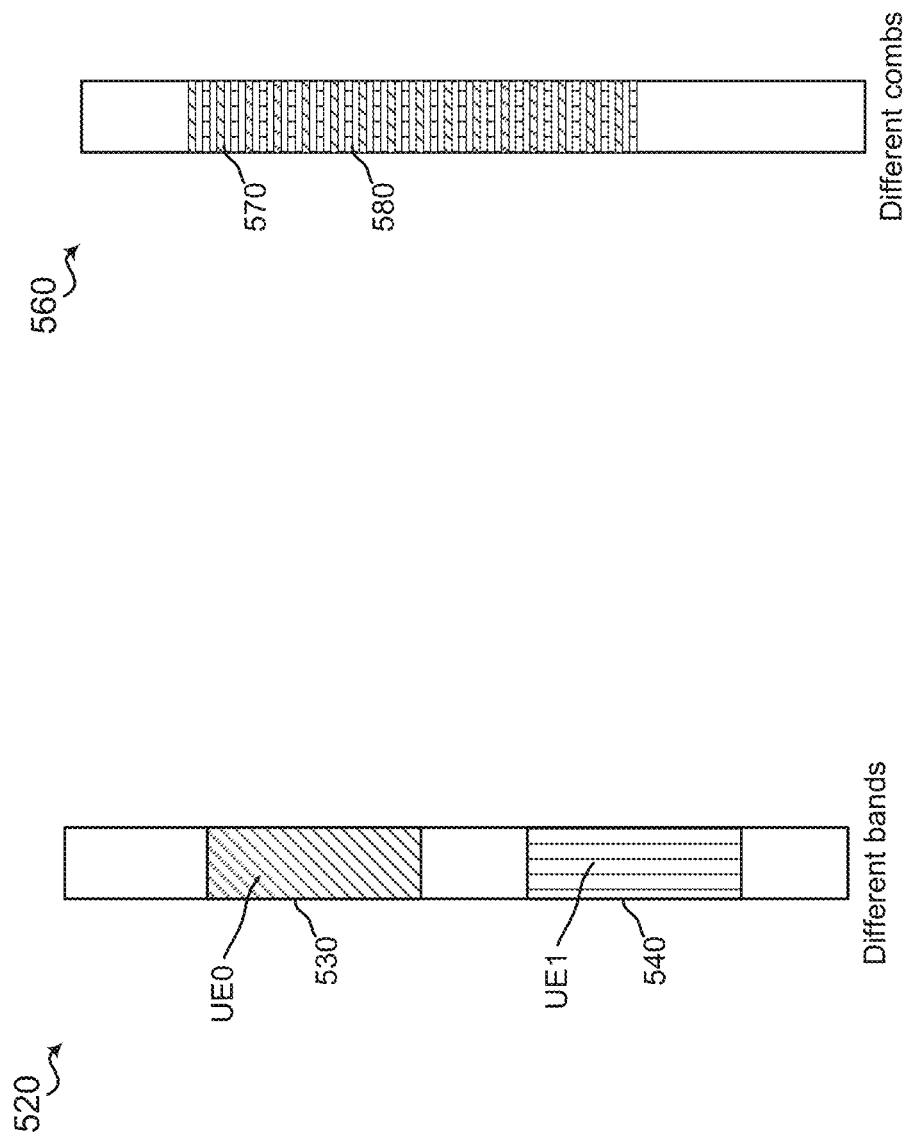

MULTIPLEXING FOR SEQUENCE BASED ACKNOWLEDGEMENT DESIGN FOR NEW RADIO

CROSS-REFERENCE TO RELATED APPLICATIONS

The present Application for Patent claims priority to Provisional Application No. 62/486,414 entitled "Multiplexing for Sequence Based Acknowledgement Design for New Radio" filed Apr. 17, 2017, which is assigned to the assignee, and incorporated herein by reference in its entirety.

BACKGROUND

Aspects of the present disclosure relate generally to wireless communication networks, and more particularly, to techniques for transmitting acknowledgements (ACKs) or negative acknowledgements (NACKs) in wireless communications.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, in a new radio (NR), a sequence based ACK/NACK technique may be used for transmitting one or two ACK/NACK bits in a uplink (UL) short burst. However, the sequence based ACK/NACK technique may not work well if ACK/NACKs of multiple UEs (e.g., users) are to be transmitted to a base station.

Thus, there is a need for improved techniques to efficiently transmit ACK/NACKs to the base station.

SUMMARY

The following presents a simplified summary of one or more aspects to provide a basic understanding of such aspects. This summary is not an extensive overview of all contemplated aspects, and is intended to neither identify key or critical elements of all aspects nor delineate any aspects. Its sole purpose is to present concepts of one or more aspects in a simplified form as a prelude to the more detailed description presented later.

In an aspect, the present disclosure includes a method, an apparatus, and a computer-readable medium for wireless communications. The example method may determine, at a base station, a distance between a first user equipment (UE) and a second UE of a plurality of UEs, wherein the distance is determined based on one or more of a sequence length, a number of hypothesis, or a number of UEs sharing an orthogonal frequency division multiplexing (OFDM) symbol. The example method may determine, at the base station, a plurality of cyclic shifts for each of the first UE and the second UE, wherein the plurality of cyclic shifts are determined relative to a base sequence and based on the distance and the number of UEs sharing the OFDM symbol. The example method may assign one or more sequences to each of the first UE and the second UE, wherein the one or more sequences assigned to the first UE and the second UE are based on a corresponding plurality of cyclic shifts associated with the first UE and the second UE. The example method may receive, at the base station, a multiplexed signal, wherein the multiplexed signal includes at least one bit of uplink control information (UCI) from the first UE and the second UE multiplexed on an uplink short burst transmitted via the OFDM symbol, wherein the UCI includes one or more of an acknowledgement (ACKs), negative ACK (NACKs) or a scheduling request (SR).

In an additional aspect, the present disclosure includes a method, an apparatus, and a computer-readable medium for wireless communications. The example method may determine, at a base station, one or more frequency resources for a first UE and a second UE of a plurality of UEs. The example method may assign, at the base station, the determined one or more frequency resources to each of the first UE and the second UE. The example method may include assign, at the base station, one or more cyclic shifts to each of the first UE and the second UE. The method may receive, at the base station, a multiplexed signal, wherein the multiplexed signal includes at least one bit of UCI from the first UE and the second UE based on a frequency division multiplexing (FDM) or code division multiplexing (CDM) on an uplink short burst transmitted via an OFDM symbol, wherein the UCI includes one or more of an ACKs, NACKs, or a scheduling request SR.

In an aspect, the present disclosure includes a method, an apparatus, and a computer-readable medium for wireless communications. The example method may receive one or more sequences assigned to the UE by a base station, in which the one or more sequences are assigned by the base station based on a plurality of cyclic shifts associated with the UE and determined by the base station relative to a base sequence and based on a distance between the UE and a second UE and a number of UEs sharing an orthogonal OFDM symbol. The method may transmit UCI as part of a multiplexed signal, wherein the multiplexed signal includes at least one bit of UCI from the UE and the second UE multiplexed on an uplink short burst transmitted via the OFDM symbol.

In such aspects, the distance may be determined by the base station based on one or more of a sequence length, a number of hypothesis, or the number of UEs sharing the OFDM symbol.

In a further aspect, the present disclosure includes a method, an apparatus, and a computer-readable medium for wireless communications. The example method may receive one or more frequency resources determined by a base station. The method may transmit uplink control information (UCI) as part of a multiplexed signal, wherein the multiplexed signal includes at least one bit of UCI from the first UE and the second UE based on a FDM or CDM on an uplink short burst transmitted via an orthogonal frequency division multiplexing (OFDM) symbol.

The present disclosure also includes an apparatus having components or configured to execute or means for executing the above-described methods. The present disclosure also includes a computer-readable medium storing one or more codes executable by a processor to perform the above-described methods.

To the accomplishment of the foregoing and related ends, the one or more aspects comprise the features described and particularly pointed out in the claims. This description and the annexed drawings set forth in detail certain illustrative features of the one or more aspects. These features are indicative, however, of but a few of the ways in which the principles of various aspects may be employed, and this description should include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 illustrates an example of shifted sequences in aspects of the present disclosure.

FIG. 5A illustrates an example frequency division multiplexing (FDM) technique in which UEs may be separated in frequency domain with different bands.

FIG. 5B illustrates an example FDM technique in which the frequencies occupied by different UEs are interlaced.

DETAILED DESCRIPTION

Figure 1:
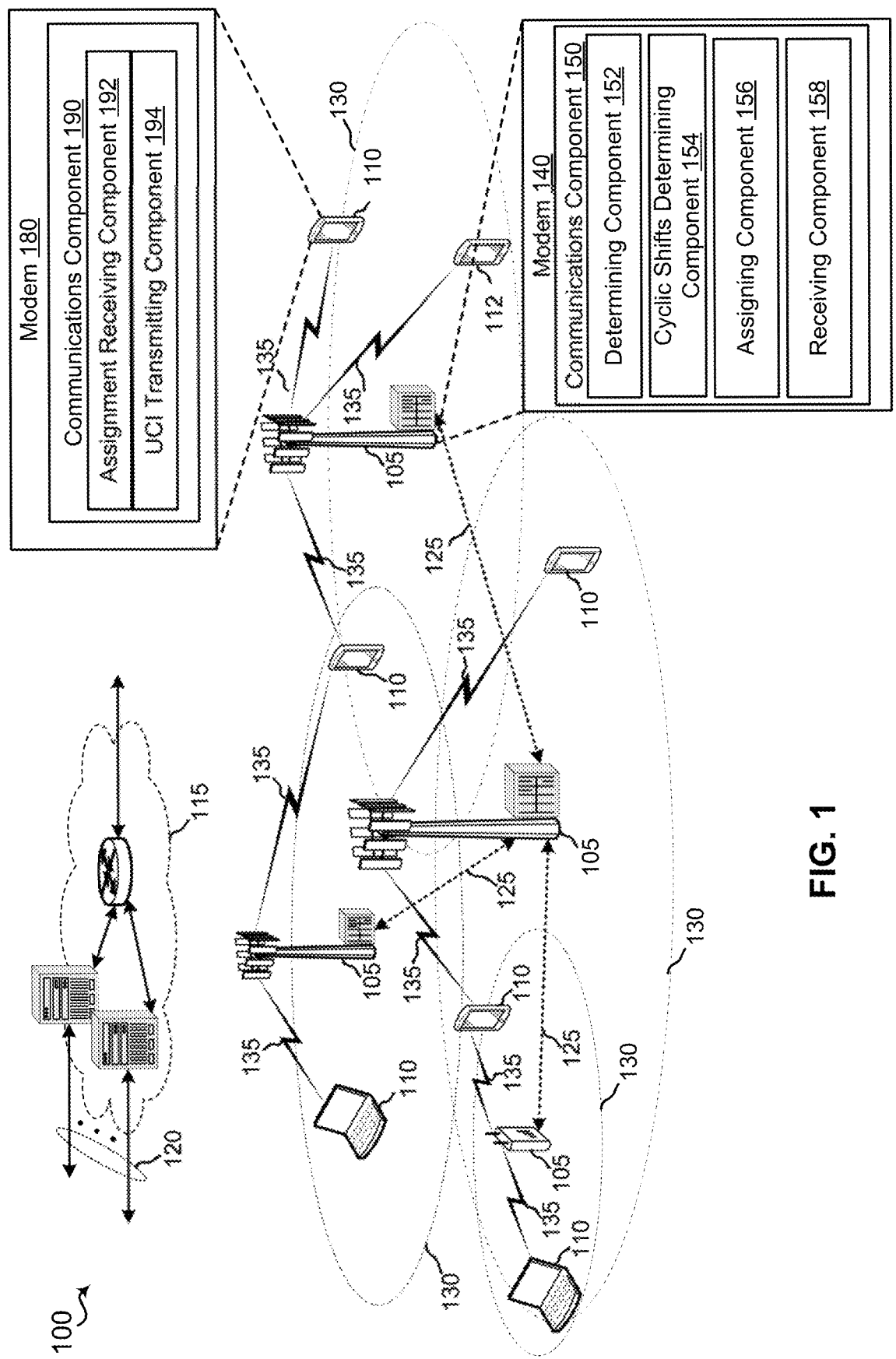
FIG. 1 is a schematic diagram of a wireless communication network including at least base station having a communications component configured according to this disclosure for wireless communications, and at least two user equipment having a corresponding communication component configured according to this disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to enabling mapping of different user equipment (UE) uplink control information (UCI) to multiplexed signals based on a distance. For example, base station (e.g., a gNB) may determine the distance between two UEs based on one or more of a sequence length, a number of hypothesis, or a number of UEs sharing an orthogonal frequency division multiplexing (OFDM) symbol. The distance, along with the number of UEs sharing the OFDM symbol and a base sequence, may be used by the gNB to determine a plurality of cyclic shifts for each of the UEs. One or more sequences may be assigned to each UE based on the plurality of cyclic shifts. The sequences may be used by the UEs to allocate resources for transmission of the UCI to the gNB. Thus, the gNB may receive a multiplexed signal, including at least one bit of UCI from the first UE and the second UE multiplexed on an uplink short burst transmitted via the OFDM symbol, wherein the UCI includes one or more of an acknowledgement (ACKs), negative ACK (NACKs) or a scheduling request (SR).

The present disclosure may optionally include that the distance is a hypothesis distance, a user distance, or a random distance. A hypothesis distance may be a distance between a first hypothesis and a second hypothesis associated with a first UE or the second UE. In some implementations, the hypothesis distance may be the maximum allowable hypothesis distance. In some aspects, the first hypothesis may be an ACK and the second hypothesis may be a NACK.

The present disclosure may optionally include that the distance is a user distance between the first UE and a second UE. In some aspects, the user distance may be the maximum user distance. However, in some implementations, the distance is based on random assigning of sequences to the first UE and the second UE.

The present disclosure may optionally include that the one or more UCI bits comprise at least one SR bit and at least one ACK bit. For example, the UCI bits may be a 2-bit hybrid automatic repeat request (HARD)-ACK and an SR. In such aspects, the distance between cyclic shifts determined by the gNB may be constrained. For example the distance between two of the plurality of cyclic shifts may be 6. In some implementations, distance between any two adjacent cyclic shifts of the plurality of cyclic shifts may be 3. In some aspects, the UCI may include at least one SR bit, at least one ACK bit, or at least one SR bit and at least one ACK bit. In some aspects, the UCI may include at most one SR bit, at most two ACK bits or at most one SR bit and at most two ACK bits.

Further, the present disclosure generally relates to enabling mapping of different UE's UCI to multiplexed signals based on frequency. For example, the gNB may determine one or more frequency resources and shifts for two UEs. The gNB may assign the frequency resources to each of the UEs The. The frequency resources and the shifts may be used by the UEs to generate and transmit UCI via a multiplexed signal. The gNB may receive the multiplexed signal including at least one bit of UCI from the first UE and the second UE based on FDM or CDM on an uplink short burst transmitted via an OFDM symbol. In some implementations, the UCI may include one or more of an ACKs, NACKs, or a SR.

The present disclosure may optionally include that the one or more frequency resources are located in different bands. Further, the present disclosure may optionally include that the one or more frequency resources are based on different combs for the first UE and the second UE. In some implementations, the one or more cyclic shifts have maximum hypothesis distance.

Other aspects of the present disclosure may generally relate to enabling a UE to use a gNB assigned mapping of different UE UCI to multiplexed signals based on a distance, to transmit at least one bit of UCI to the gNB. For example, the UE may receive one or more sequences assigned to the UE by the gNB. The gNB may have previously determined the one or more sequences are assigned to the UE based on a plurality of cyclic shifts associated with the UE. These cyclic shifts may in turn be previously determined by the gNB and determined by the gNB relative to a base sequence and based on a distance between the UE and a second UE as well as a number of UEs sharing an orthogonal OFDM symbol. The distance may be determined by the gNB based on one or more of a sequence length, a number of hypothesis, or the number of UEs sharing the OFDM symbol. The UE may use the assigned one or more sequences configure transmission of the UCI in a physical uplink control channel (PUCCH). The UE may transmit UCI as part of a multiplexed signal, wherein the multiplexed signal includes at least one bit of UCI from the UE and the second UE multiplexed on an uplink short burst transmitted via the OFDM symbol.

Further aspects of the present disclosure may generally relate to enabling a UE to use a gNB assigned mapping of different UE UCI to multiplexed signals based on frequency, to transmit at least one bit of UCI to the gNB. For example, the UE receive one or more frequency resources and one or more cyclic shifts determined by the gNB. The shifts and frequency resources may be determined by the gNB with a variety of techniques. The UE may use the assigned frequency resources and shifts to transmit uplink control information (UCI) as part of a multiplexed signal, wherein the multiplexed signal includes at least one bit of UCI from the first UE and the second UE based on a FDM or CDM on an uplink short burst transmitted via an orthogonal frequency division multiplexing (OFDM) symbol.

The various aspects of the present disclosure may reduce error and dropped bits in transmission of multiple sequence based ACK/NACK/SR. The aspects provide methods for mapping the ACK/NACK/SR of different UEs to a PUCCH that is carried over single multiplexed signal. By providing mapping techniques based on easily definable parameters (e.g., UE distance and frequency shifts) the various aspects a way to transmit/receive multiple UE UCI information in a single multiplexed signal.

Additional features of the present aspects are described in more detail below with respect to FIGS. 1-9.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA20001X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one base station 105 (e.g., an eNB, a gNB, or the like) with a modem 140 having a communications component 150 that manages execution of a determining component 152, a cyclic shifts determining component 154, a assigning component 156, and/or a receiving component 158. The example wireless communication network 100 may further include a plurality of UEs, e.g., a first UE, e.g., UE 110, and a second UE, UE 112. The UE 110 may further include a modem 180 having a communications component 190. The communications component 190 may include an assignment receiving component 192, which may receive control information from a gNB, such a sequences, frequency resources, and/or shifts that the UE 110 may use to map UCI bits for a PUCCH to a multiplexed signal. The communications component 190 may also include a UCI transmitting component 194 for transmitting an ACK, a NACK, and/or a scheduling request (SR) to base station 105. The UE 112 may be another UE with an instance of communications component 190 whose ACK/NACK may be multiplexed with ACK/NACK of UE 110 for transmitting to the base station 105 on an uplink short burst.

According to the present disclosure, for example, base station 105 may receive ACKs or NACKs or scheduling requests (SR) that are multiplexed and received over a UL short burst via an OFDM symbol. The UL short burst of a DL centric slot or a UL centric slot may be configured with one or two OFDM symbols and may be used to carry time-sensitive information, e.g., uplink control information (UCI), such as ACK or NACK bits, or SR, from the UEs.

In one bit UL short burst configuration, two hypotheses, an ACK and a NACK may be supported. The mechanism may be extended to support more than two hypotheses, for example, three, four, five, or more hypotheses, Although the sequence based ACK design provides low peak to average power ration (PAPR), it is not optimal for higher payloads. Therefore, ACKs/NACKs from multiple UEs may be multiplexed on the one or two OFDM symbols of the UL short burst for efficient delivery of ACKs/NACKs to base station 105. The ACKs/NACKs may be multiplexed using code division multiplexing (CDM), frequency division multiplexing (FDM) which may be band based or comb based, or time division multiplexing. In general, when using CDM, different users are separated with different cyclic shifts. For instance, given a total number N shifts, and M users, each user has N/M shifts for hypothesis testing. For example, if N=4 shifts for M=2 users, then each user has 1 bit ACK. In general, when using FDM, different users are separated with different frequencies, which may include using different bands or different combs. Comb based FDM may be better for more frequency diversity. For example, for M=2 users each in one of 2 combs, then each have 2 sequences for hypothesis testing. In general, when using TDM, different users transmit using different OFDM symbols. If multiple symbols are available when using TDM, then different users use different symbols. When multiple symbols are available, in some implementations it may be better to use CDM of combed based design to multiplex users, as each user then transmits on multiple symbols with frequency hopping for diversity.

In one aspect, CDM may be used for multiplexing ACKs/NACKs over an OFDM symbol. For example, communications component 150 may determine a distance between a first UE (e.g., UE 110) and a second UE (e.g., UE 112) of the plurality of UEs, wherein the distance is determined based on one or more of a sequence length, a number of hypothesis, or a number of UEs sharing an orthogonal frequency division multiplexing (OFDM) symbol. Further, the communications component 150 determines a plurality of cyclic shifts for each of the first UE and the second UE, wherein the plurality of cyclic shifts are determined relative to a base sequence and based on the distance and the number of UEs sharing the OFDM symbol. Furthermore, the communications component 150 assigns one or more sequences to each of the first UE and the second UE, wherein the one or more sequences assigned to the first UE and the second UE are based on a corresponding plurality of cyclic shifts associated with the first UE and the second UE. Additionally, the communications component 150 (which may include a determining component 152, cyclic shifts determining component 154, an assigning component 156, and/or a receiving component 158) receives a multiplexed signal, wherein the multiplexed signal includes acknowledgements (ACKs) or negative ACKs (NACKs) from the first UE and the second UE multiplexed on a uplink short burst transmitted via the OFDM symbol.

In an additional aspect, FDM or CDM may be used for multiplexing ACKs/NACKs over an OFDM symbol. For example, communications component 150 may determine one or more frequency resources for a first UE and a second UE of a plurality of UEs. Further, the communications component 150 may assign the determined one or more frequency resources to each of the first UE and the second UE. Furthermore, the communications component 150 may receive a multiplexed signal, wherein the multiplexed signal includes acknowledgements (ACKs) or negative ACKs (NACKs) from the first UE and the second UE based on a FDM or CDM on a uplink short burst transmitted via an orthogonal frequency division multiplexing (OFDM) symbol.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (gNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (gNB) may be generally used to describe the base stations 105, while the term UE may be generally used to describe the UEs 110. The wireless communication network 100 may be a heterogeneous technology network in which different types of gNBs provide coverage for various geographical regions. For example, each gNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for the core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro gNBs, small cell gNBs, macro gNBs, small cell gNBs, relay base stations, and the like.

A UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, the base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of the base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, the base stations 105 and/or UEs 110 operating according to the mmW technology may utilize beamforming in their transmissions to compensate for the extremely high path loss and short range.

Figure 2:
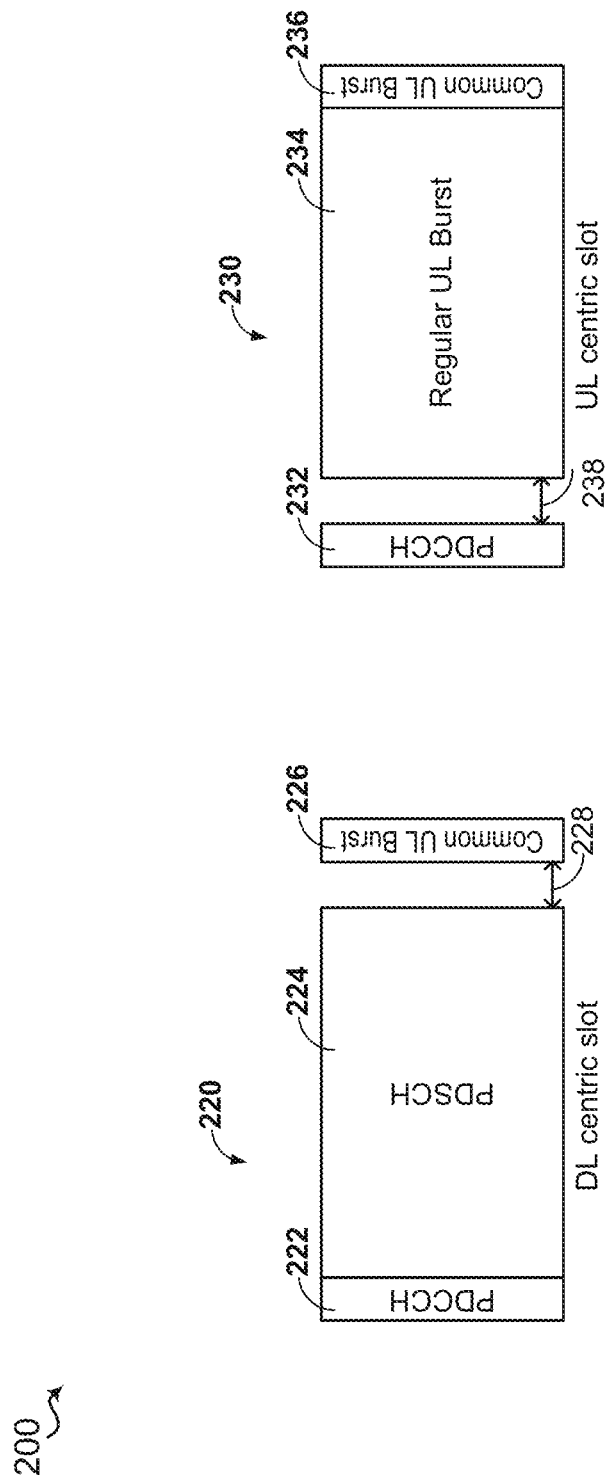
FIG. 2 illustrates an example slot (or frame) structure including a downlink centric slot and/or a uplink centric slot.

Referring to FIG. 2, an example slot (or frame) structure 200 includes a downlink centric slot 220 and/or a uplink centric slot 230. As illustrated in FIG. 2, a downlink centric slot 220 may include a physical downlink control channel (PDCCH) 222, a physical downlink shared channel (PDSCH) 224, and/or a common uplink burst 226. A uplink centric slot 230 may include a PDCCH 232, a regular uplink burst 234, and/or a common uplink burst 236. The common uplink bursts, 226 and 236, may transmit uplink control information (UCI)(e.g., ACK bits), and are, in general, of fixed length (e.g., one or two OFDM symbols in length. For example, common uplink bursts 226 and/or 236 of 1 or 2 bits may use sequence based ACK design, e.g., one sequence for each hypothesis. Sequence based ACK design may be used to achieve low peak to average power ratio (PAPR) of the transmitted signal. Each hypothesis uses a different sequence. For example, a 1 bit transmission may use 2 sequences, while a 2 bit transmission may use 4 sequences. Further, this may be extended to multiplexing with sounding reference signal (SRS) and/or SR. For instance, examples of this design may include, but are not limited to: SRS+1 bit ACK having 3 hypothesis, such as SRS+DTX, SRS+ACK, or +NACK; SRS+2 bit ACK having 5 hypothesis; or SR+1 bit ACK having 4 hypothesis, such as for: ACK, NACK, SR+ACK, SR+NACK.

In some implementations, a guard interval 228 may separate PDSCH 224 and common uplink burst 226, and/or a guard interval 238 may separate PDSCH 232 and a regular uplink burst 234 to minimize or avoid interference.

Figure 3A:
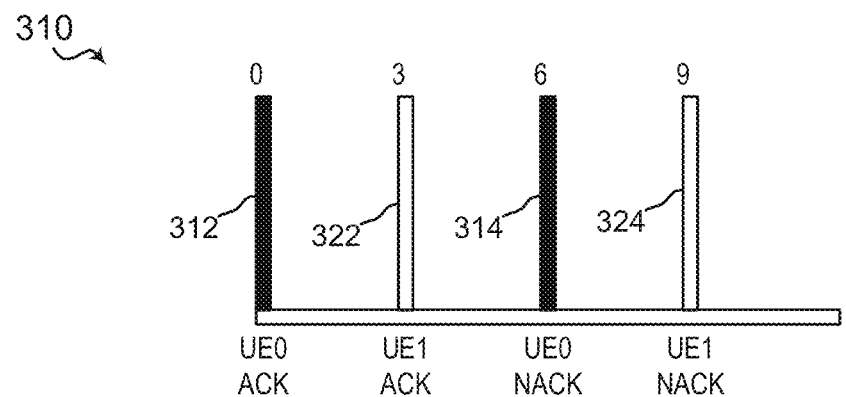
FIG. 3A illustrates an example multiplexing technique that maximizes hypothesis distance in accordance with aspects of the present disclosure.
Figure 3B:
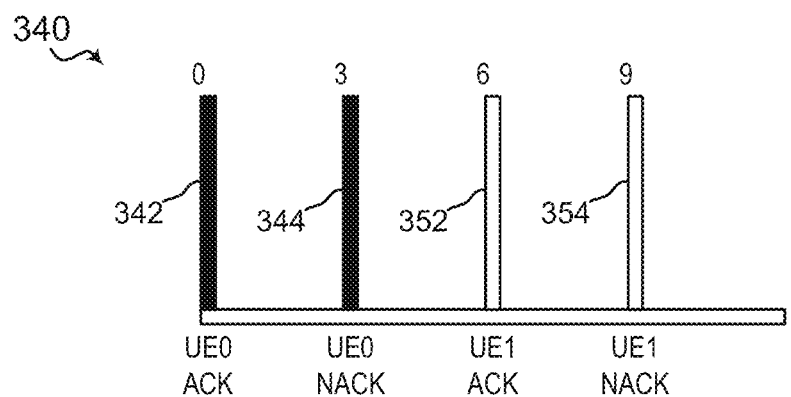
FIG. 3B illustrates an example multiplexing technique that maximizes user distance in accordance with aspects of the present disclosure.
Figure 3C:
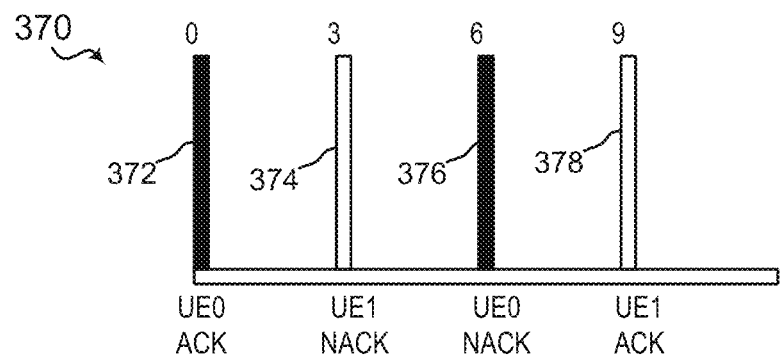
FIG. 3C illustrates an example multiplexing technique based on random allocation of cyclic shifts (or assignment of sequences) in accordance with aspects of the present disclosure.

FIGS. 3A-3C illustrate example code division multiplexing (CDM) techniques for sequence based ACK/NACK design for NR.

FIG. 3A illustrates an example multiplexing technique 310 that maximizes hypothesis distance in accordance with aspects of the present disclosure. The distance between the different hypothesis of a UE, e.g., a distance between an ACK and a NACK of a UE, may be referred to as the hypothesis distance. In one aspect, the multiplexing may be based on maximizing the hypothesis distance associated for each of the UEs.

Referring to FIG. 3A, UE0 and UE1 (same or similar to UEs 110 and 112 of FIG. 1) may be transmitting ACKs or NACKs to base station 105. For example, in an aspect, the UE0 may support two hypotheses, an ACK or a NACK, e.g., UE0 ACK (312) or UE0 NACK (314), and UE1 may support two hypotheses, an ACK or a NACK, e.g., UE1 ACK (322) or a UE1 NACK (324).

In an aspect, the multiplexing component 150 at the base station 105 may determine a maximum hypothesis distance associated with the UE0 and UE1. A hypothesis distance may be defined as a ratio of a sequence length ("L") and a number of hypothesis ("B") as shown below:

Hypothesis Distance=Sequence Length($L$)/Number of Hypothesis($B$)

The sequence length, L, may be of any size, e.g., a multiple of twelve (number of sub-carries in a resource element), and the number of hypothesis may be defined as $2^{bits}$ being transmitted. For example, in an aspect, the number of bits may be 1, and based on the number of bits being one, the hypothesis distance with L being 12 is 6 (e.g., 12/2=6). In another example, the number of bits may be two, and based on the number of bits being two, the hypothesis distance with L being 12 is 3 (e.g., 12/4=3).

The multiplexing component 150 at the base station 105 may determine a plurality of cyclic shifts associated with the UE0 based on the hypothesis distance and the number of UEs ("B"), also referred to as users (two UEs in this example). For example, for a user "i," the cyclic shifts in the time domain may be determined based on the following:

$i*(L/B/M), LB+i*(L/B/M), 2*(LB)+i*(L/B/M)$,

That is, for UE0, i=0, and the cyclic shifts in the time domain are as shown below:

$0*(12/2/2), 12/2+0*(12/2/2)$ 0, 6

That is, the cyclic shifts for UE0 may be determined as 0 and 6.

Similarly, for UE1, the cyclic shifts in the time domain may be determined based on the following:

$1*(12/2/2), 12/2+1*(12/2/2)$ 3, 9

That is, the cyclic shifts for UE1 may be determined as 3 and 9.

In an example aspect, with a sequence length of 12, the multiplexing component 150 at the base station 105 may determine 0 and 6 as the cyclic shifts for UE0 310 and 3 and 9 as cyclic shifts for UE1. The multiplexing component 150 at the base station 105 upon determining the cyclic shifts for UE0 and UE1 assigns sequences to the UEs based on corresponding cyclic shifts associated with the UEs. For example, sequences associated with cyclic shifts 0 and 6 may be assigned to UE0 and sequences associated with cyclic shifts 3 and 9 may be assigned to UE1. The sequences are assigned in such a way that the hypothesis distance, e.g., distance between hypotheses (e.g., ACK and NACK) of UE0 is at a maximum. The multiplexing component 150 at the base station 105 determines the sequence based on the cyclic shifts relative to the base sequence, as described in detail in reference to FIG. 4. It should also be noted that two cyclic shifts may be used to transmit 1 bit which may be an ACK or a NACK.

The ACKs or NACKs from UE0 and UE1 are multiplexed in a code division multiplexing (CDM) manner and transmitted in an uplink short burst to base station 105. Upon receiving of the multiplexed signal, base station 105 correlates the received signal with the hypotheses sequences one after the other. The base station 105 then compares the energy of the two correlations and determines which correlation has the higher energy to determine the correct hypothesis. For example, if the correlation related to a NACK of UE0 has higher energy compared to an ACK of the UE0, the base station 105 determines that UE0 transmitted a NACK. The multiplexing mechanism, for example, CDM based on maximizing hypothesis distance allows ACKs or NACKs from multiple UEs transmitted to have a DMRS pattern in the frequency domain. For example, for 1 bit, with two sequences with length 12, and shifts 0 and 6 for ACK and NACK respectively, every other of the transmitted tones will be the same regardless which sequence is actually being transmitted. These tones may be used at the receiver side (e.g., at base station 105) as DMRS tones for channel or noise estimation. When different users are multiplexed in the same symbol with different shifts, the receiver will first extract the desired user signals before estimating channel or noise variance with known DMRS tones.

FIG. 3B illustrates an example multiplexing technique 340 that maximizes user distance in accordance with aspects of the present disclosure. The distance between the different UEs, e.g., UE0 and UE1, may be referred to as the user distance. In one aspect, the multiplexing may be based on maximizing the user distance.

Referring to FIG. 3B, the UEs, UE0 and UE1 (same or similar to UEs 110 and 120 of FIG. 1) may be transmitting ACKs or NACKs to base station 105. For example, in an aspect, the UE0 may support two hypotheses, an ACK or a NACK, e.g., UE0 ACK (342)/UE0 NACK (344) and UE1 may support two hypotheses as well, an ACK or a NACK, e.g., UE1 ACK (352) or a UE1 NACK (354).

In one example, the multiplexing component 150 may determine a user distance, e.g., a maximum user distance, between UE0 and UE1. A user distance may be defined as a ratio of a sequence length ("L) and a number users ("M") as shown below:

User Distance=Sequence Length($L$)/Number of Users ($M$)

The sequence length (L) may be of any length, e.g., a multiple of twelve, and the number of users may be defined as two. Therefore, in one aspect, the user distance may be six (e.g., 12/2=6).

The multiplexing component 150 at the base station 105 may determine a plurality of cyclic shifts associated with the UE0 or UE1 based on the user distance and a number of number of hypothesis ("B"). For example, for a user "i," the cyclic shifts in the time domain based on the user distance may be determined based on the following:

$i*(L/M), i*(L/M)+(L/B/M), i*(L/M)+2*(L/B/M)$

That is, for UE0310, i=0, and the cyclic shifts in the time domain are as shown below:

0*(12/2),0*(12/2)+(12/2/2)

0, 3, . . .

That is, the cyclic shifts for UE0 may be determined as 0, 3, etc.

Similarly, for UE1, the cyclic shifts in the time domain may be determined based on the following:

1*(12/2),1*(12/2)+(12/2/2)

6, 9, . . .

That is, the cyclic shifts for UE1 may be determined as 6, 9, etc.

In an example aspect, with a sequence length of 12, the multiplexing component 150 at the base station 105 may determine 0 and 3 as the cyclic shifts for UE0 and 6 and 9 as cyclic shifts for UE1. The multiplexing component 150 at the base station 105 upon determining the cyclic shifts for UE0 and UE1 assigns sequences to the UEs based on corresponding cyclic shifts associated with the UEs. For example, sequences associated with cyclic shifts 0 and 3 may be assigned to UE0 and sequences associated with cyclic shifts 6 and 9 may be assigned to UE1. Maximum shift distance is allowed for ACK or NACK hypothesis from different UEs. The sequences are assigned in such a way that the user distance, e.g., distance between the users (e.g., UE0 and UE1) is at a maximum. The multiplexing component 150 at the base station 105 determines the sequences based on the cyclic shifts relative to the base sequence. Because one sequence mapping of an ACK/NACK/SR may not require a sequence of 12 indices, the remaining indices of the sequence may be assigned to one or more additional UEs. Thus, each RB may include the sequence portions of multiple UEs. In other aspects, the ACK/NACK/SR of a single UE may require all 12 sequence indices, such that one RB contains only a single ACK/NACK/SR.

FIG. 3C illustrates an example multiplexing technique 370 based on random allocation of cyclic shifts (or assignment of sequences) in accordance with aspects of the present disclosure.

In an aspect, for example, the cyclic shifts, as described above in reference to FIGS. 3A and 3B, may be randomly assigned to hypotheses associated with the UEs. For example, cyclic shifts of 0 and 6 may be respectively assigned to UE0 ACK (372) and UE0 NACK (376) and cyclic shifts 3 and 9 may be respectively assigned to UE1 NACK (374) and UE1 NACK (378). In an additional or optional aspect, cyclic shifts of 0 and 9 may be respectively assigned to UE0ACK/NACLs and cyclic shifts 3 and 6 may be respectively assigned to UE1 NACK/ACLs. The random allocation of the cyclic shifts provides flexibility.

FIG. 4 illustrates an example of shifted sequences 400 in aspects of the present disclosure.

For example, in an aspect, for a sequence with a length L, a cyclic shift of L/2 (e.g., half of the length) in the time domain leads to sign alternative flipping in a frequency domain as shown below:

$S[(n+L/2)\%L] \rightarrow S[k](-1)^k$

The multiplexing based on maximizing hypothesis distance in time domain may lead to special properties in frequency domain as shown in 410 and 430 related to an ACK and a NACK of UE0. For example, a set of alternate tones are identical (e.g., 412/432, 416/436, 420/440, 424/444, identified in bold) and another set of alternate tones (e.g., 414/434, 418/438, 422/442, 426/446) are opposite to each other. This results in a pattern which could be used as a demodulation reference signal (DMRS) for identifying a hypothesis associated with a UE. In another example, a set of alternate tones are identical (e.g., 452/472, 456/476, 460/480, 464/484, identified in bold), and another set of alternate tones (e.g., 454/474, 458/478, 462/482, 466/486) are opposite to each other.

FIGS. 5A-5B illustrate example frequency division multiplexing (FDM) techniques for sequence based ACK/NACK design for NR.

FIG. 5A illustrates an example frequency division multiplexing (FDM) technique 520 where the UEs, e.g., UE0 are UE1, may be separated in frequency domain with different bands. For example, UE0 occupies upper portion of the band (530) and UE1 occupies lower portion of the band (540).

FIG. 5B illustrates an example frequency division multiplexing (FDM) technique 560 where the frequencies occupied by UE0 and UE1 are interlaced as shown by 570 and 580. For example, UE0 are UE1 may be separated in frequency domain with different combs. In one aspect, UE0 may occupy even tones and UE1 may occupy odd tones.

Each band or comb may support different shifts or hypothesis, and the tones (based on LB) may be used to create demodulation reference signal (DMRS) tones in frequency domain. Further, the FDM based multiplexing may be used to support fractional shifts where L is not a multiple of B.

Figure 6:
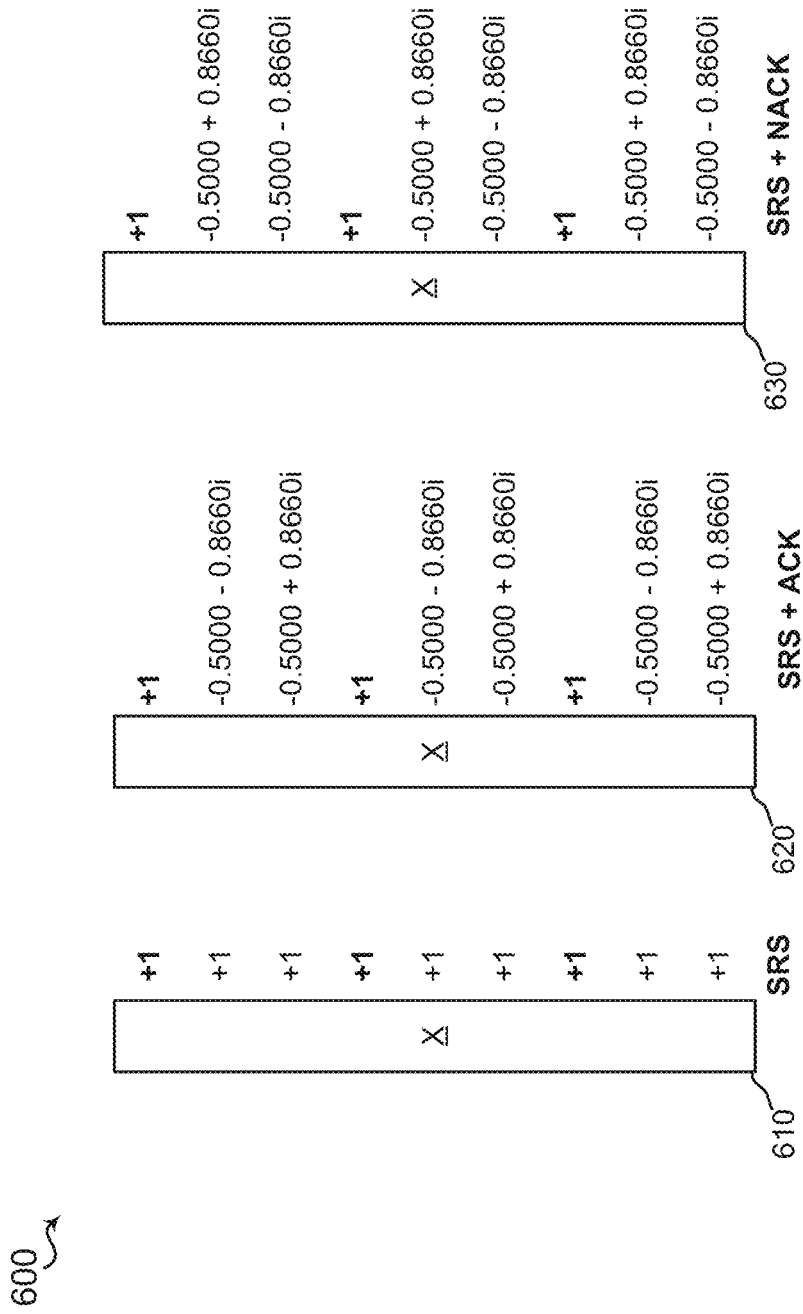
FIG. 6 illustrates an example of fractional shifts with phase ramping 600 to support discontinuous transmission (DTX).

FIG. 6 illustrates an example of fractional shifts with phase ramping 600 to support discontinuous transmission (DTX).

As illustrated in FIG. 6, the phase shifts 610, 620, and 630 are associated with sequences for a scheduling request (SR), SR+ACK, and SR+NACK based on the same base sequence with 0, L/3, and 2L/3 shift. Every three tones are the same for the three sequences. So regardless which sequence is actually transmitted, these tones are known at the receiver side and can therefore be used for channel or noise estimation. When L is not a multiple of 3, for example, L=16, we may use fractional shifts.

Figure 7A:
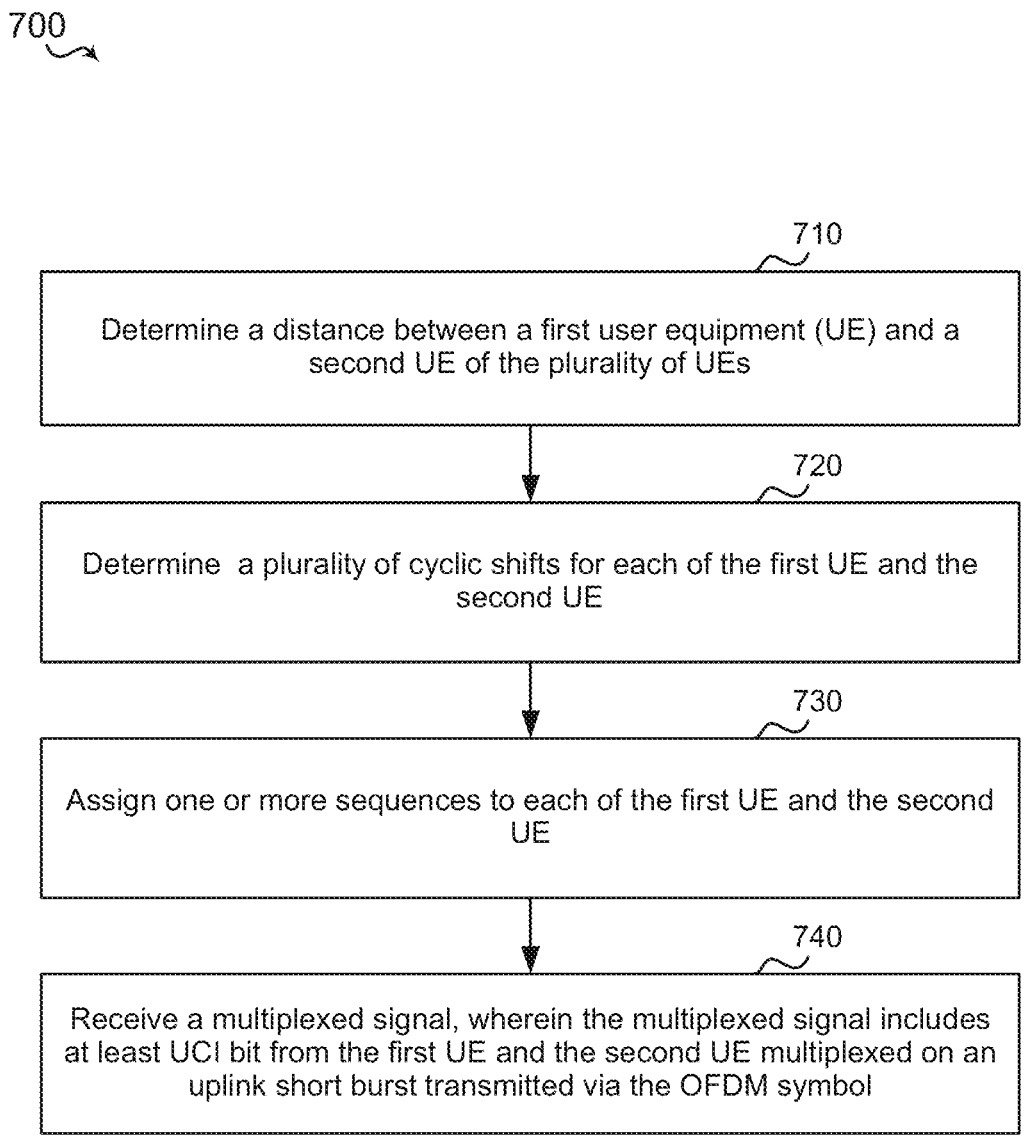
FIG. 7A illustrate an example method of multiplexing signals based on user distance in wireless communications according to the above-described aspects.

Referring to FIG. 7A, for example, a method 700 for wireless communications according to the above-described aspects is disclosed.

For example, at block 710, the method 700 includes determining, at a gNB, a distance between a first user equipment (UE) and a second UE of a plurality of UEs, wherein the distance is determined based on one or more of a sequence length, a number of hypothesis, or a number of UEs sharing an orthogonal frequency division multiplexing (OFDM) symbol. For instance, in an aspect, the gNB 104 and/or modem 140 may execute the communications component 150 and/or the determining component 152 to determine a distance between a first user equipment (UE) and a second UE of a plurality of UEs, wherein the distance is determined based on one or more of a sequence length, a number of hypothesis, or a number of UEs sharing an orthogonal frequency division multiplexing (OFDM) symbol.

Further, at block 720, the method 700 includes determining, at the gNB, a plurality of cyclic shifts for each of the first UE and the second UE, wherein the plurality of cyclic shifts are determined relative to a base sequence and based on the distance and the number of UEs sharing the OFDM symbol. For instance, in an aspect, the UE 110 and/or modem 140 may execute the communications component 150 and/or the cyclic shifts determining component 154 to determine a plurality of cyclic shifts for each of the first UE and the second UE, wherein the plurality of cyclic shifts are determined relative to a base sequence and based on the distance and the number of UEs sharing the OFDM symbol.

Furthermore, at block 730, the method 700 may include assigning one or more sequences to each of the first UE and the second UE, wherein the one or more sequences assigned to the first UE and the second UE are based on a corresponding plurality of cyclic shifts associated with the first UE and the second UE. For instance, in an aspect, the UE 110 and/or modem 140 may execute the communications component 150 and/or assigning component 156 to assign one or more sequences to each of the first UE and the second UE, wherein the one or more sequences assigned to the first UE and the second UE are based on a corresponding plurality of cyclic shifts associated with the first UE and the second UE.

Furthermore, at block 740, the method 700 may include receiving, at the gNB, a multiplexed signal, wherein the multiplexed signal includes at least one UCI bit from the first UE and the second UE multiplexed on an uplink short burst transmitted via the OFDM symbol. For instance, in an aspect, the UE 110 and/or modem 140 may execute the communications component 150 and/or receiving component 158 to receive a multiplexed signal, wherein the multiplexed signal may include a single UCI bit such as ACK or NACK bit multiplexed with other control information bits such as SR, or multiple ACK/NACK and/or SR bits from the first UE and the second UE multiplexed on an uplink short burst transmitted via the OFDM symbol. For example, the UCI bits of the multiplexed signal may include an SR bit and an ACK bit.

Figure 7B:
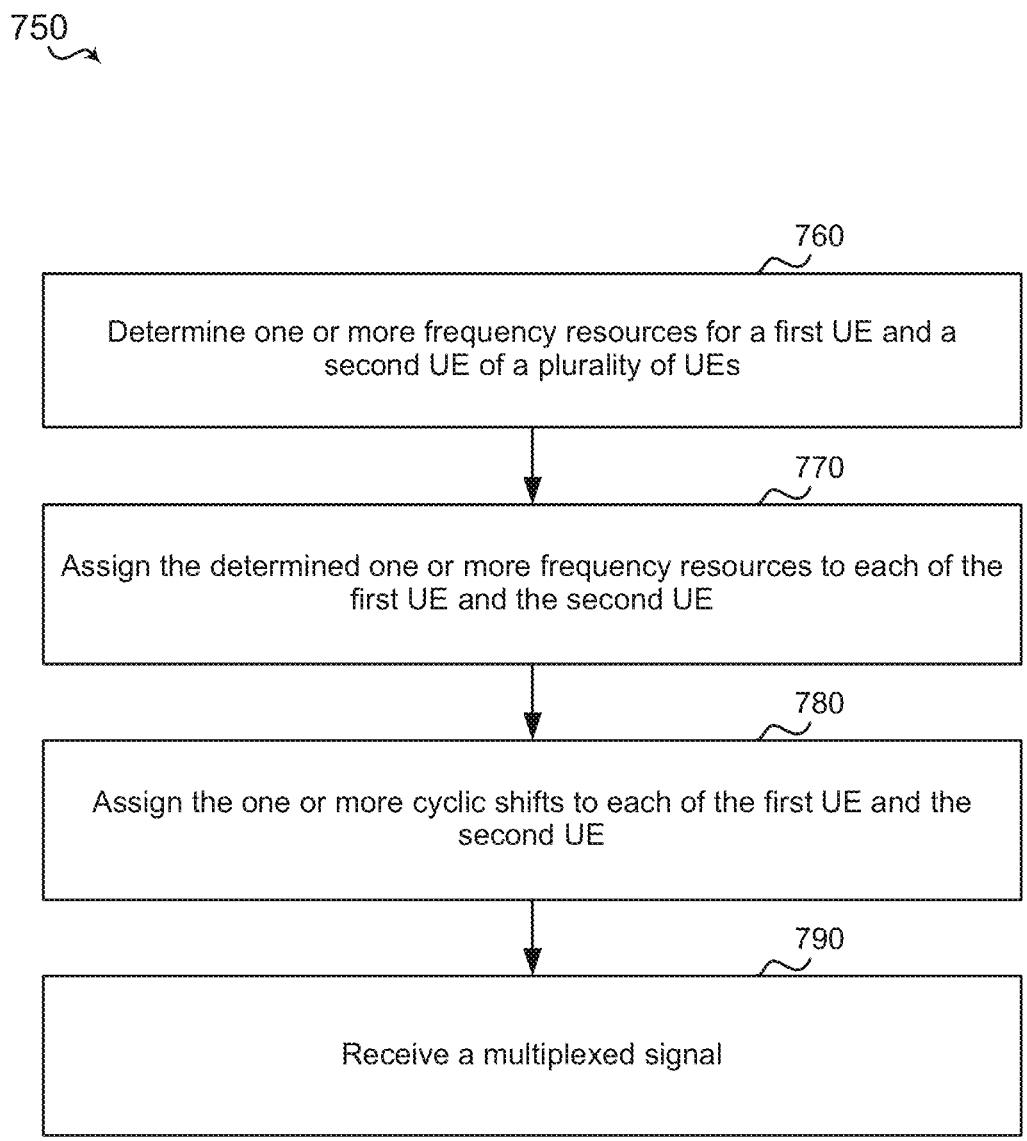
FIG. 7B illustrate an example method of wireless communications according to the above-described aspects.

Referring to FIG. 7B, for example, a method 750 for wireless communications according to the above-described aspects is disclosed.

For example, at block 760, the method 700 includes determining, at a gNB, one or more frequency resources for a first UE and a second UE of a plurality of UEs. For instance, in an aspect, the gNB 105 and/or modem 140 may execute the communications component 150 and/or the determining component 152 to determine one or more frequency resources for a first UE and a second UE of a plurality of UEs.

For example, at block 770, the method 750 includes assigning, at the gNB, the determined one or more frequency resources to each of the first UE and the second UE. For instance, in an aspect, the UE 110 and/or modem 140 may execute the communications component 150 and/or the assigning component 156 to assign the determined one or more frequency resources to each of the first UE and the second UE.

Further, at block 780, the method 700 includes assigning, at a gNB, one or more shifts to each of the first UE and the second UE. For instance, in an aspect, the gNB 104 and/or modem 140 may execute the communications component 150 and/or the cyclic shifts determining component 156 to assign the determined one or more shifts to each of the first UE and the second UE.

Furthermore, at block 790, the method 700 may include receiving, at the gNB, a multiplexed signal, wherein the multiplexed signal includes at least one bit of uplink control information (UCI) from the first UE and the second UE based on a frequency division multiplexing (FDM) on an uplink short burst transmitted via an orthogonal frequency division multiplexing (OFDM) symbol, wherein the UCI includes one or more of an acknowledgement (ACKs), negative ACK (NACKs) or a scheduling request (SR). For instance, in an aspect, the UE 110 and/or modem 140 may execute the communications component 150 and/or receiving component 158 to receive a multiplexed signal, wherein the multiplexed signal includes ACKs, NACKs, and/or SRs from the first UE and the second UE based on a FDM or CDM on an uplink short burst transmitted via an OFDM symbol. The UCI may include one or more of the ACK/NACK/SR bits or a combination thereof, e.g., an HARQ-ACK and SR combination.

Figure 8A:
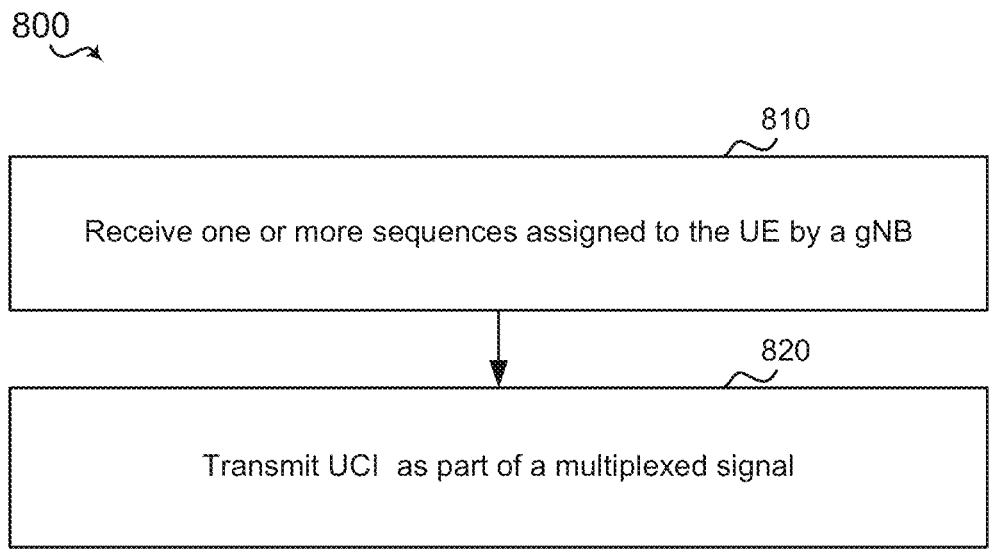
FIG. 8A illustrate an example method of transmitting multiplexing signals based on received sequences in wireless communications according to the above-described aspects.

Referring to FIG. 8A, for example, a method 800 for wireless communications according to the above-described aspects is disclosed.

For example, at block 810, the method 800 includes receiving, at a UE 110, one or more sequences assigned to the UE 110 by a gNB (e.g., base station 105), wherein the one or more sequences are assigned by the gNB based on a plurality of cyclic shifts associated with the UE 110 and determined by the gNB relative to a base sequence and based on a distance between the UE and a second UE and a number of UEs sharing an OFDM symbol. For instance, in an aspect, the UE 110 and/or modem 180 may execute the communications component 190 and/or the assignment receiving component 192 to receive sequences from the gNB. The sequences may be assigned to the UE based on a plurality of cyclic shifts associated with the UE. These cyclic shifts may be determined based on by the gNB relative to a base sequence and based on a distance between the UE and a second UE and a number of UEs sharing an OFDM symbol. In various aspects, the distance is determined by the gNB based on one or more of a sequence length, a number of hypothesis, or the number of UEs sharing the OFDM symbol.

For example, at block 820, the method 800 includes transmitting, by the UE, UCI as part of a multiplexed signal, wherein the multiplexed signal includes at least one bit of UCI from the UE and the second UE multiplexed on an uplink short burst transmitted via the OFDM symbol. For instance, in an aspect, the UE 110 and/or modem 180 may execute the communications component 190 and/or the UCI transmitting component 194 to transmit at least one bit of UCI information via an OFDM symbol, based on the mapping associated with the received one or more sequences.

Figure 8B:
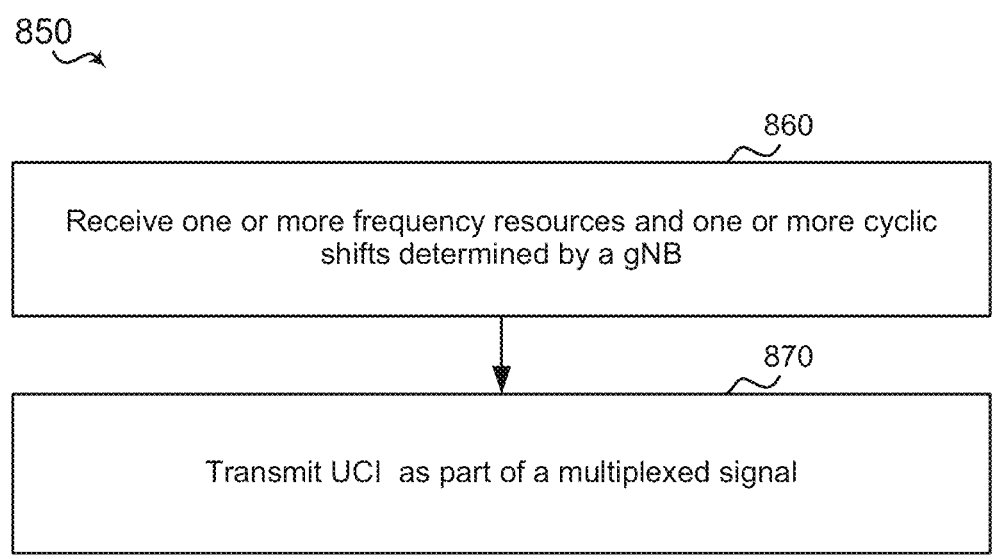
FIG. 8B illustrate an example method of transmitting multiplexing signals based on received fin wireless communications according to the above-described aspects.

Referring to FIG. 8B, for example, a method 850 for wireless communications according to the above-described aspects is disclosed.

For example, at block 860, the method 850 includes receiving, by the UE 110, one or more frequency resources and one or more cyclic shifts determined by a gNB (e.g., base station 105). For instance, in an aspect, the UE 110 and/or modem 180 may execute the communications component 190 and/or the assignment receiving component 192 to receive one or more frequency resources and one or more shifts from the gNB. For example, at block 870, the method 850 includes transmitting, by the UE, UCI as part of a multiplexed signal, wherein the multiplexed signal includes at least one bit of UCI from the first UE and the second UE based on a FDM or CDM on an uplink short burst transmitted via an OFDM symbol.

For instance, in an aspect, the UE 110 and/or modem 180 may execute the communications component 190 and/or the assignment receiving component 192 to receive one or more frequency resources and one or more shifts from the gNB. For instance, in an aspect, the UE 110 and/or modem 180 may execute the communications component 190 and/or the UCI transmitting component 194 to transmit at least one bit of UCI information via an OFDM symbol, based on the mapping associated with the received one or more frequency resources and shifts.

Figure 9:
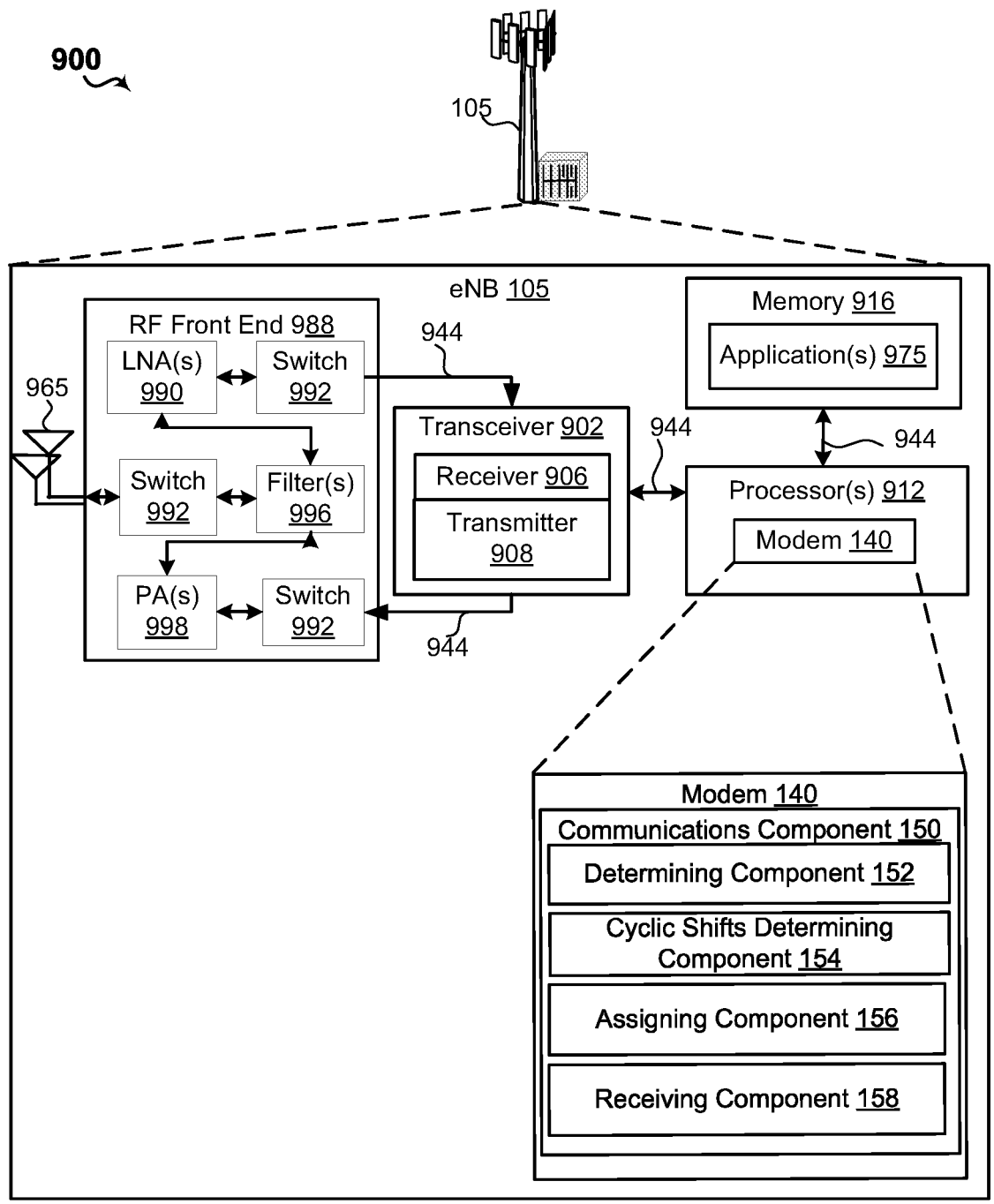
FIG. 9 is a schematic diagram of example components of the base station of FIG. 1.

Referring to FIG. 9, one example of an implementation of an base station 105 may include a variety of components, some of which have already been described above, including components such as one or more processors 912, memory 916 and transceiver 902 in communication via one or more buses 944, which may operate in conjunction with the modem 140 and communications component 150 for wireless communications. Further, the one or more processors 912, modem 140, memory 916, transceiver 902, RF front end 999 and one or more antennas 965, may be configured to support voice and/or data calls (simultaneously or non-simultaneously) in one or more radio access technologies.

In an aspect, the one or more processors 912 can include a modem 140 that uses one or more modem processors. The various functions related to communications component 150 may be included in modem 140 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with the transceiver 902. In other aspects, some of the features of the one or more processors 912 and/or modem 140 associated with the communications component 150 may be performed by the transceiver 902.

Also, the memory 916 may be configured to store data used herein and/or local versions of applications 975 or communications component 150 and/or one or more of its subcomponents being executed by at least one processor 912. The memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, the memory 916 may be a non-transitory computer-readable storage medium that stores one or more computer-executable codes defining communications component 150 and/or one or more of its subcomponents, and/or data associated therewith, when the base station 105 is operating at least one processor 912 to execute the communications component 150 and/or one or more of its subcomponents (e.g., subcomponents 152-158).

The transceiver 902 may include at least one receiver 906 and at least one transmitter 909. The receiver 906 may include hardware, firmware, and/or software code executable by a processor for receiving data, the code comprising instructions and being stored in a memory (e.g., computer-readable medium). The receiver 906 may be, for example, a radio frequency (RF) receiver. In an aspect, the receiver 906 may receive signals transmitted by at least one base station 105. Additionally, the receiver 906 may process such received signals, and also may obtain measurements of the signals, such as, but not limited to, Ec/Io, SNR, RSRP, RSSI, etc. The transmitter 908 may include hardware, firmware, and/or software code executable by a processor for transmitting data, the code comprising instructions and being stored in a memory (e.g., computer-readable medium). A suitable example of the transmitter 908 may include, but is not limited to, a RF transmitter.

Moreover, in an aspect, the base station 105 may include a RF front end 988, which may operate in communication with one or more antennas 965 and transceiver 902 for receiving and transmitting radio transmissions, for example, wireless communications transmitted by at least one base station 105 or wireless transmissions transmitted by the base station 105. The RF front end 988 may be communicatively coupled with one or more antennas 965 and can include one or more low-noise amplifiers (LNAs) 990, one or more switches 992, one or more power amplifiers (PAs) 998, and one or more filters 996 for transmitting and receiving RF signals.

In an aspect, the LNA 990 can amplify a received signal at a desired output level. In an aspect, each LNA 990 may have a specified minimum and maximum gain values. In an aspect, the RF front end 988 may use one or more switches 992 to select a particular LNA 990 and its specified gain value based on a desired gain value for a particular application.

Further, for example, one or more PA(s) 998 may be used by the RF front end 988 to amplify a signal for an RF output at a desired output power level. In an aspect, each PA 998 may have specified minimum and maximum gain values. In an aspect, the RF front end 988 may use one or more switches 992 to select a particular PA 998 and its specified gain value based on a desired gain value for a particular application.

Also, for example, one or more filters 996 can be used by the RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, the RF front end 988 can use one or more switches 992 to select a transmit or receive path using a specified filter 996, LNA 990, and/or PA 998, based on a configuration as specified by the transceiver 802 and/or processor 912.

As such, the transceiver 902 may be configured to transmit and receive wireless signals through one or more antennas 965 via RF front end 988. In an aspect, the transceiver 902 may be tuned to operate at specified frequencies such that the base station 105 can communicate with, for example, one or more UEs 110. In an aspect, for example, the modem 140 can configure the transceiver 902 to operate at a specified frequency and power level based on the configuration of the base station 105 and communication protocol used by the modem 140.

In an aspect, the modem 140 can be a multiband-multimode modem, which can process digital data and communicate with the transceiver 902 such that the digital data is sent and received using the transceiver 902. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the base station 105 (e.g., RF front end 999, transceiver 902) to enable transmission and/or reception of signals from the network based on a specified modem configuration. In an aspect, the modem configuration can be based on the mode of the modem and the frequency band in use. In another aspect, the modem configuration can be based on base station information associated with the base station 105 as provided by the network during cell selection and/or cell reselection.

Figure 10:
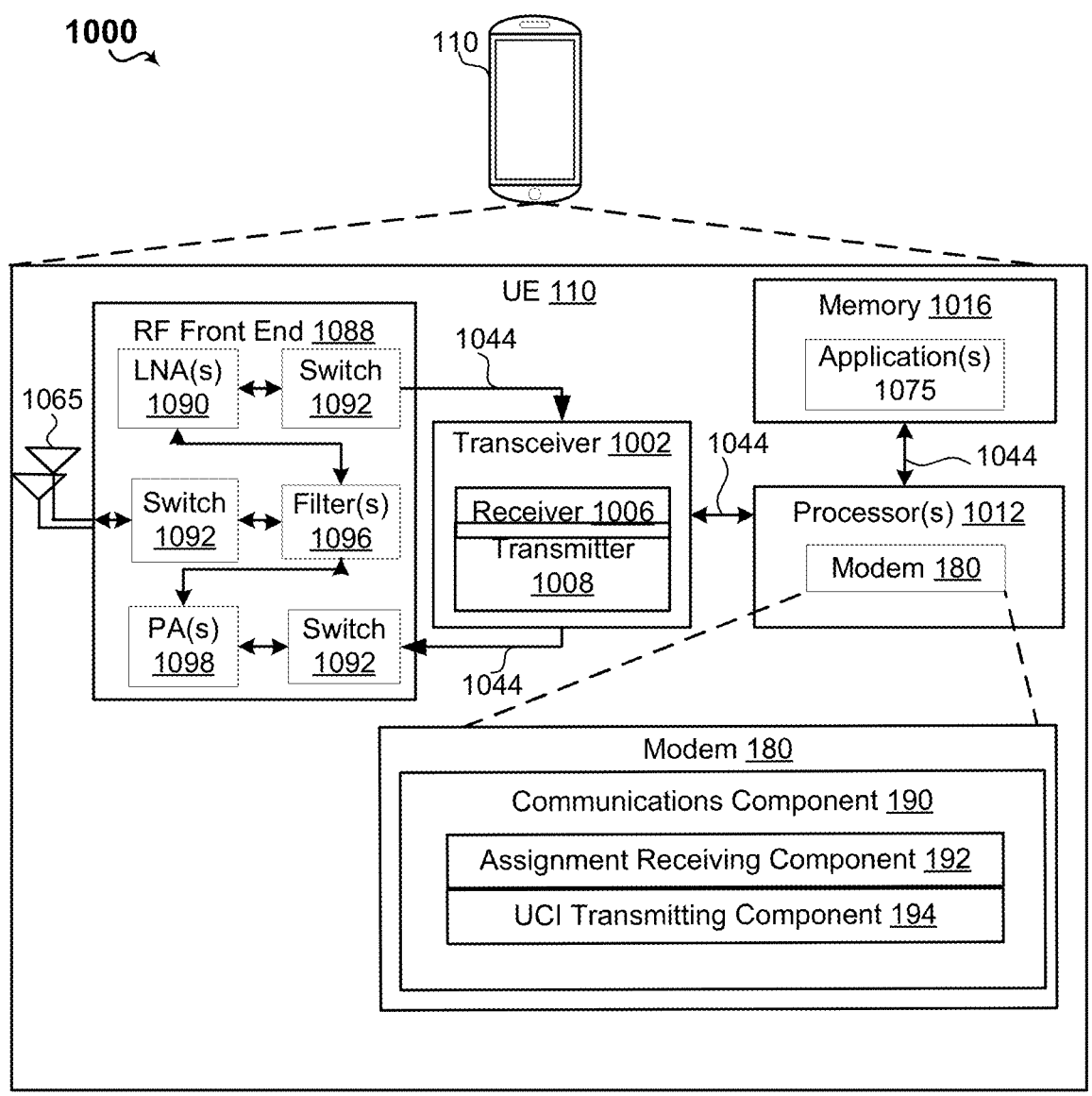
FIG. 10 is a schematic diagram of example components of the UE of FIG. 1.

Referring to FIG. 10, one example of implementing an UE 110 may include many components, some of which have been described above, and including components such as one or more processors 1012 and memory 1016 and transceiver 1002 in communication via one or more buses 1044, which may operate with modem 1014 and communications component 190 to enable one or more functions described herein related to receiving communications and control information from a gNB (e.g., base station 105) at the UE in a wireless communication system. Further, the one or more processors 1012, modem 1014, memory 1016, transceiver 1002, radio frequency (RF) front end 1088 and one or more antennas 1065, may be configured to support voice and/or data calls (simultaneously or non-simultaneously) in one or more radio access technologies. In some aspects, the modem 1014 may be the same as or similar to the modem 140 (FIG. 1).

In an aspect, the one or more processors 1012 can include modem 140 that uses one or more modem processors. The functions related to communications component may be included in modem 180 and/or processors 1012 and, in an aspect, can be executed by a single processor, while in other aspects, different ones of the functions may be executed by two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some features of the one or more processors 1012 and/or modem 140 associated with communications component 190 may be performed by transceiver 1002.

Also, memory 1016 may be configured to store data used and/or local versions of applications 1075 or communications component 190 and/or one or more of its subcomponents being executed by at least one processor 1012. Memory 1016 can include any computer-readable mediums usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining communication component 1100 and/or one or more of its subcomponents, and/or data associated therewith, when UE 110 is operating at least one processor 1012 to execute communications component 190 and/or one or more of its subcomponents (e.g., subcomponents 192-194).

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a RF receiver. In an aspect, receiver 1006 may receive signals transmitted by at least one BASE STATION 105. And receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may include, but is not limited to, an RF transmitter.

In an aspect, the UE 110 may include RF front end 1088, which may operate in communication with one or more antennas 1065 and transceiver 1002 for receiving and transmitting radio transmissions, for example, wireless communications transmitted by at least one base station 105105 or wireless transmissions transmitted by the UE 110. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, the RF front end 1088 may use one or more switches 1092 to select a particular PA 1098 and a corresponding specified gain value based on a desired gain value for a particular application.

Also, for example, one or more filters 1096 can be used by the RF front end 1088 to filter a received signal to obtain an input RF signal. Similarly, in an aspect, for example, a respective filter 1096 can filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

Transceiver 1002 may be configured to transmit and receive wireless signals through one or more antennas 1065 via RF front end 1088. In an aspect, transceiver may be tuned to operate at specified frequencies so the UE 110 can communicate with, for example, one or more APs 105 or one or more cells associated with one or more APs 105. In an aspect, for example, modem 180 can configure transceiver 1002 to operate at a specified frequency and power level based on the UE configuration of the UE 110 and the communication protocol used by modem 180.

In an aspect, modem 180 can be a multiband-multimode modem, which can process digital data and communicate with transceiver 902 so the digital data is sent and received using transceiver 1002. In an aspect, the modem 180 can be multiband and be configured to support multiple frequency bands for a specific communications protocol. In an aspect, the modem 180 can be multimode and be configured to support multiple operating networks and communications protocols. In an aspect, the modem 140 can control one or more components of the UE 110 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications, comprising:
   determining, at a base station, a plurality of cyclic shifts for each of a first UE and a second UE, wherein the plurality of cyclic shifts are determined relative to a base sequence and separated by a hypothesis distance, wherein the hypothesis distance is based on a number of hypotheses, wherein the hypothesis distance is a distance between a first hypothesis and a second hypothesis associated with a first UE and a second UE for an orthogonal frequency division multiplexing (OFDM) symbol;
   assigning one or more sequences to each of the first UE and the second UE, wherein the one or more sequences assigned to the first UE and the second UE are based on a corresponding plurality of cyclic shifts associated with the first UE and the second UE; and
   receiving, at the base station, a multiplexed signal, wherein the multiplexed signal includes at least one bit of uplink control information (UCI) from the first UE and the second UE multiplexed on an uplink short burst transmitted via the OFDM symbol.

2. The method of claim 1, wherein the at least one bit of UCI includes one or more bits of an acknowledgement (ACKs), negative ACK (HACK) or a scheduling request (SR).

3. The method of claim 2, wherein the distance is based on random assigning of sequences to the first UE and the second UE.

4. The method of claim 1, wherein the hypothesis distance is a maximum hypothesis distance.

5. The method of claim 1, wherein the first hypothesis is an ACK and the second hypothesis is a NACK.

6. The method of claim 1, wherein the at least one bit of UCI comprises at least one scheduling request (SR) bit, at least one acknowledgement (ACK) bit, or at least one SR bit and at least one ACK bit.

7. The method of claim 6, wherein the hypothesis distance between two of the plurality of cyclic shifts is 6 for 2 UCI hypothesis from one UE.

8. The method of claim 6, wherein the minimum hypothesis distance between any two adjacent cyclic shifts of the plurality of cyclic shifts is 3 for 4 UCI hypothesis from one UE.

9. The method of claim 6, wherein receiving the multiplexed signal includes receiving the at least one SR bit and the at least one ACK bit in a short physical uplink control channel (PUCCH) for the at least one bit of UCI of up to 2 bits.

10. The method of claim 6, wherein the at least one bit of UCI comprises at most one scheduling request (SR) bit, at most two acknowledgement (ACK) bits, or at most one SR bit and at most two ACK bits.

11. The method of claim 1, wherein the sequence has a length of 12 indices.

12. The method of claim 1, wherein one cyclic shift includes only a single scheduling request (SR).

13. The method of claim 1, wherein the multiplexed signal includes UCI from both the first UE and the second UE.

14. A method of wireless communications, comprising:
   determining, at a base station, a distance between a first user equipment (UE) and a second UE of a plurality of UEs, wherein the distance is determined based on one or more of a sequence length, a number of hypothesis, or a number of UEs sharing an orthogonal frequency division multiplexing (OFDM) symbol;
   determining, at the base station, a plurality of cyclic shifts for each of the first UE and the second UE, wherein the plurality of cyclic shifts are determined relative to a base sequence and based on the distance and the number of UEs sharing the OFDM symbol;
   assigning one or more sequences to each of the first UE and the second UE, wherein the one or more sequences assigned to the first UE and the second UE are based on a corresponding plurality of cyclic shifts associated with the first UE and the second UE; and
   receiving, at the base station, a multiplexed signal, wherein the multiplexed signal includes at least one bit of uplink control information (UCI) from the first UE and the second UE multiplexed on an uplink short burst transmitted via the OFDM symbol, wherein the at least one bit of UCI includes one or more bits of an acknowledgement (ACKs), negative ACK (NACK) or a scheduling request (SR), and wherein the distance is the user distance, and wherein the user distance is a distance between the first UE and a second UE.

15. The method of claim 14, wherein the user distance is a maximum user distance.

16. A method of wireless communications, comprising:
   determining, at a base station, one or more frequency resources for a first user equipment (UE) and a second UE of a plurality of UEs;
   assigning, at the base station, the determined one or more frequency resources to each of the first UE and the second UE;
   assigning, at the base station, one or more cyclic shifts to each of the first UE and the second UE based on a sequence length and a number of hypotheses, wherein a distance between the cyclic shifts is a hypothesis distance between a first hypothesis and a second hypothesis associated with a UE, and wherein the UE is the first UE or the second UE, wherein the first hypothesis is an ACK and the second hypothesis is a NACK; and
   receiving, at the base station, a multiplexed signal, wherein the multiplexed signal includes at least one bit of uplink control information (UCI) from the first UE and the second UE based on a frequency division multiplexing (FDM) on an uplink short burst transmitted via an orthogonal frequency division multiplexing (OFDM) symbol.

17. A base station, comprising:
   a memory; and
   a processor in communication with the memory and configured to:
      determine a plurality of cyclic shifts for each of a first UE and a second UE, wherein the plurality of cyclic shifts are determined relative to a base sequence and separated by a hypothesis distance, wherein the hypothesis distance is based on a number of hypotheses, wherein the hypothesis distance is a distance between a first hypothesis and a second hypothesis associated with a first UE and a second UE for an orthogonal frequency division multiplexing (OFDM) symbol;

assign one or more sequences to each of the first UE and the second UE, wherein the one or more sequences assigned to the first UE and the second UE are based on a corresponding plurality of cyclic shifts associated with the first UE and the second UE; and receive a multiplexed signal, wherein the multiplexed signal includes at least one bit of uplink control information (UCI) from the first UE and the second UE multiplexed on an uplink short burst transmitted via the OFDM symbol.

18. The base station of claim 17, wherein the at least one bit of UCI includes one or more bits of an acknowledgement (ACKs), negative ACK (HACK) or a scheduling request (SR).

19. The base station of claim 18, wherein the distance is based on random assigning of sequences to the first UE and the second UE.

20. The base station of claim 17, wherein the hypothesis distance is a maximum hypothesis distance.

21. The base station of claim 17, wherein the first hypothesis is an ACK and the second hypothesis is a NACK.

22. The base station of claim 17, wherein the at least one bit of UCI comprises at least one scheduling request (SR) bit, at least one acknowledgement (ACK) bit, or at least one SR bit and at least one ACK bit.

23. The base station of claim 22, wherein the hypothesis distance between two of the plurality of cyclic shifts is 6 for 2 UCI hypothesis from one UE.

24. The base station of claim 22, wherein the minimum hypothesis distance between any two adjacent cyclic shifts of the plurality of cyclic shifts is 3 for 4 UCI hypothesis from one UE.

25. The base station of claim 22, wherein the at least one bit of UCI comprises at most one scheduling request (SR) bit, at most two acknowledgement (ACK) bits, or at most one SR bit and at most two ACK bits.

26. The base station of claim 17, wherein the sequence has a length of 12 indices.

27. The base station of claim 17, wherein one cyclic shift includes only a single scheduling request (SR).

28. The base station of claim 17, wherein the multiplexed signal includes UCI from both the first UE and the second UE.

29. The base station of claim 18, A base station, comprising:
a memory; and
a processor in communication with the memory and configured to:
determine a distance between a first user equipment (UE) and a second UE of a plurality of UEs, wherein the distance is determined based on one or more of a sequence length, a number of hypothesis, or a number of UEs sharing an orthogonal frequency division multiplexing (OFDM) symbol;
determine a plurality of cyclic shifts for each of the first UE and the second UE, wherein the plurality of cyclic shifts are determined relative to a base sequence and based on the distance and the number of UEs sharing the OFDM symbol;
assign one or more sequences to each of the first UE and the second UE, wherein the one or more sequences assigned to the first UE and the second UE are based on a corresponding plurality of cyclic shifts associated with the first UE and the second UE; and
receive a multiplexed signal, wherein the multiplexed signal includes at least one bit of uplink control information (UCI) from the first UE and the second UE multiplexed on an uplink short burst transmitted via the OFDM symbol, wherein the at least one bit of UCI includes one or more bits of an acknowledgement (ACKs), negative ACK (NACK) or a scheduling request (SR), and wherein the distance is the user distance, and wherein the user distance is a distance between the first UE and a second UE.

30. The base station of claim 29, wherein the user distance is a maximum user distance.

31. A base station, comprising:
a memory; and
a processor in communication with the memory and configured to:
determine one or more frequency resources for a first user equipment (UE) and a second UE of a plurality of UEs;
assign the determined one or more frequency resources to each of the first UE and the second UE;
assign one or more cyclic shifts to each of the first UE and the second UE based on a sequence length and a number of hypotheses, wherein a distance between the cyclic shifts is a hypothesis distance between a first hypothesis and a second hypothesis associated with a UE, and wherein the UE is the first UE or the second UE, wherein the first hypothesis is an ACK and the second hypothesis is a NACK; and
receive a multiplexed signal, wherein the multiplexed signal includes at least one bit of uplink control information (UCI) from the first UE and the second UE based on a frequency division multiplexing (FDM) on an uplink short burst transmitted via an orthogonal frequency division multiplexing (OFDM) symbol.

32. A method of wireless communications, comprising:
receiving control information, at a user equipment (UE) from a base station;
mapping, by the UE, uplink control information (UCI) to a signal based on the control information, wherein the signal comprises a sequence from a plurality of sequences corresponding to different hypotheses,
wherein the plurality of sequences are determined relative to a base sequence based on a plurality of cyclic shifts, wherein the plurality of cyclic shifts are separated by a hypothesis distance, wherein the hypothesis distance is a distance between a first hypothesis and a second hypothesis associated with the UE, and wherein the first hypothesis is an ACK and the second hypothesis is a NACK; and
transmitting, by the UE, the sequence from the plurality of sequences on an uplink short burst transmitted via an orthogonal frequency division multiplexing (OFDM) symbol, wherein the sequence is mapped from at least one bit of UCI.

33. A method of wireless communication comprising:
receiving, at a user equipment (UE), one or more frequency resources and a plurality of cyclic shifts determined by a base station based on a sequence length and a number of hypotheses, wherein a distance between the cyclic shifts is a hypothesis distance between a first hypothesis and a second hypothesis associated with the UE, and wherein the first hypothesis is an ACK and the second hypothesis is a NACK; and transmitting, by the UE, uplink control information (UCI) as part of a multiplexed signal, wherein the multiplexed signal includes a sequence shifted by a selected cyclic shift of the plurality of cyclic shifts, wherein the selected cyclic shift is mapped from at least one bit of UCI from the UE based on a frequency division multiplexing (FDM) on an uplink short burst transmitted via an orthogonal frequency division multiplexing (OFDM) symbol.

34. A user equipment (UE) comprising:

a memory; and a processor in communication with the memory and configured to:

receive control information; from a base station, map, by the UE, uplink control information (UCI) to a signal based on the control information, wherein the signal comprises a sequence from a plurality of sequences corresponding to different hypotheses, wherein the plurality of sequences are determined relative to a base sequence based on a plurality of cyclic shifts, wherein the plurality of cyclic shifts are separated by hypothesis distance, wherein the hypothesis distance is a distance between a first hypothesis and a second hypothesis associated with the UE, and wherein the first hypothesis is an ACK and the second hypothesis is a NACK; and transmit the sequence from the plurality of sequences on an uplink short burst transmitted via an orthogonal frequency division multiplexing (OFDM) symbol, wherein the sequence is mapped from at least one bit of UCI.

* * * * *